United States Patent
Sumiya et al.

(10) Patent No.: US 11,914,035 B2
(45) Date of Patent: Feb. 27, 2024

(54) INSPECTION SYSTEM FOR INSPECTING CONTENTS OF A TARGET PERSON, AND INSPECTION METHOD THEREOF

(71) Applicant: NEC Corporation, Tokyo (JP)

(72) Inventors: Tatsuya Sumiya, Tokyo (JP); Shingo Yamanouchi, Tokyo (JP); Masayuki Ariyoshi, Tokyo (JP); Shinichi Morimoto, Tokyo (JP); Masanori Sekido, Tokyo (JP); Kazumine Ogura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/692,452

(22) Filed: Mar. 11, 2022

(65) Prior Publication Data

US 2023/0288560 A1 Sep. 14, 2023

(30) Foreign Application Priority Data

Mar. 19, 2021 (JP) ................................ 2021-045900

(51) Int. Cl.
*G01S 17/04* (2020.01)
*G06F 21/31* (2013.01)
*G01N 23/10* (2018.01)

(52) U.S. Cl.
CPC .............. *G01S 17/04* (2020.01); *G01N 23/10* (2013.01); *G06F 21/31* (2013.01)

(58) Field of Classification Search
CPC .......... G01S 17/04; G01N 23/10; G06F 21/31
USPC ........................................................ 250/221
See application file for complete search history.

(56) References Cited

U.S. PATENT DOCUMENTS

2017/0070501 A1* 3/2017 Saito .................... G06V 40/161
2017/0365118 A1* 12/2017 Nurbegovic ......... G01V 5/0008
2020/0393594 A1* 12/2020 Obata ....................... G06T 7/70

FOREIGN PATENT DOCUMENTS

JP 2004-126829 A 4/2004
WO 2015/136938 A1 9/2015

* cited by examiner

*Primary Examiner* — Que Tan Le
*Assistant Examiner* — Mai Thi Ngoc Tran
(74) *Attorney, Agent, or Firm* — Sughrue Mion, PLLC

(57) ABSTRACT

To shorten a waiting time for a belongings inspection, the present invention provides an inspection system 10 including an acquisition unit 11 that acquires material information including at least either one of a piece of personal unique information unique to each of inspection target persons, and a piece of environment information indicating a state value of an environment that changes at each inspection timing, and a determination unit 12 that determines a content of an inspection for the each inspection target person and/or at the each inspection timing, based on the material information.

3 Claims, 29 Drawing Sheets

FIG. 5

GROUP DEFINITION

| GROUP NUMBER | DEFINITION |
|---|---|
| 001 | POLICE OFFICER |
| 002 | CLEANING STAFF |
| 003 | SECURITY GUARD |
| 004 | FACILITY STAFF |
| 005 | OTHERS |

FIG. 6

INFORMATION FOR EACH GROUP

| GROUP NUMBER | PRESENCE OR ABSENCE OF BELONGINGS INSPECTION |
|---|---|
| 001 | ABSENCE |
| 002 | PRESENCE |
| ⋮ | ⋮ |

FIG. 7

INFORMATION FOR EACH GROUP

| GROUP NUMBER | DETECTION TARGET OBJECT |
|---|---|
| 001 | CAMERA, SMARTPHONE, ··· |
| 002 | KNIFE, GUN, CAMERA, SMARTPHONE, ··· |
| ⋮ | ⋮ |

FIG. 8

INFORMATION FOR EACH GROUP

| GROUP NUMBER | INSPECTION PORTION |
|---|---|
| 001 | UPPER BODY |
| 002 | WHOLE BODY |
| ⋮ | ⋮ |

FIG. 9

INFORMATION FOR EACH GROUP

| GROUP NUMBER | INSPECTION METHOD |
|---|---|
| 001 | PASS THROUGH |
| 002 | TEMPORARY STOP |
| ⋮ | ⋮ |

FIG. 10

INFORMATION FOR EACH GROUP

| GROUP NUMBER | REFERENCE VALUE |
|---|---|
| 001 | 80% |
| 002 | 75% |
| ⋮ | ⋮ |

FIG. 13

INFORMATION FOR EACH GROUP

| GROUP NUMBER | KIND OF INSPECTION |
|---|---|
| 001 | BODY TEMPERATURE INSPECTION |
| 002 | BODY TEMPERATURE INSPECTION, BELONGINGS INSPECTION BY ELECTROMAGNETIC WAVE, · · · |
| ⋮ | ⋮ |

FIG. 14

INFORMATION FOR EACH PERSON

| TARGET PERSON IDENTIFICATION INFORMATION | PRESENCE OR ABSENCE OF BELONGINGS INSPECTION |
|---|---|
| P013272 | PRESENCE |
| P111989 | ABSENCE |
| ⋮ | ⋮ |

FIG. 15

INFORMATION FOR EACH PERSON

| TARGET PERSON IDENTIFICATION INFORMATION | DETECTION TARGET OBJECT |
|---|---|
| P013272 | CAMERA, SMARTPHONE, ··· |
| P111989 | KNIFE, GUN, CAMERA, SMARTPHONE, ··· |
| ⋮ | ⋮ |

FIG. 16

TARGET PERSON INFORMATION

| SERIAL NUMBER | TARGET PERSON IDENTIFICATION INFORMATION | INSPECTED TARGET OBJECT |
|---|---|---|
| P0118 | *** | KNIFE(G001,8:13), GUN(G001,8:13), ・・・ |
| P0127 | *** | KNIFE(G001,8:21), GUN(G001,8:21), ・・・ |
| ・・・ | ・・・ | ・・・ |

FIG. 17

INFORMATION FOR EACH PERSON

| TARGET PERSON IDENTIFICATION INFORMATION | INSPECTION PORTION |
|---|---|
| P013272 | WHOLE BODY |
| P111989 | UPPER BODY |
| ⋮ | ⋮ |

FIG. 18

INFORMATION FOR EACH PERSON

| TARGET PERSON IDENTIFICATION INFORMATION | INSPECTION METHOD |
|---|---|
| P013272 | TEMPORARY STOP |
| P111989 | PASS THROUGH |
| ⋮ | ⋮ |

FIG. 19

INFORMATION FOR EACH PERSON

| TARGET PERSON IDENTIFICATION INFORMATION | REFERENCE VALUE |
|---|---|
| P013272 | 70% |
| P111989 | 85% |
| ⋮ | ⋮ |

FIG. 20

INFORMATION FOR EACH PERSON

| TARGET PERSON IDENTIFICATION INFORMATION | KIND OF INSPECTION |
|---|---|
| P013272 | BODY TEMPERATURE INSPECTION |
| P111989 | BODY TEMPERATURE INSPECTION, BELONGINGS INSPECTION BY ELECTROMAGNETIC WAVE, ··· |
| ⋮ | ⋮ |

FIG. 21

TARGET PERSON INFORMATION

| SERIAL NUMBER | TARGET PERSON IDENTIFICATION INFORMATION | PERFORMED INSPECTION |
|---|---|---|
| P0118 | * * * | BODY TEMPERATURE, . . . |
| ⋮ | ⋮ | ⋮ |

FIG. 22

INFORMATION FOR EACH CASE

| CASE NUMBER | PRESENCE OR ABSENCE OF BELONGINGS INSPECTION |
|---|---|
| C001 | ABSENCE |
| C002 | ABSENCE |
| C003 | PRESENCE |
| ⋮ | ⋮ |

FIG. 23

INFORMATION FOR EACH CASE

| CASE NUMBER | DETECTION TARGET OBJECT |
|---|---|
| C001 | CAMERA, SMARTPHONE, · · · |
| C002 | KNIFE, GUN, CAMERA, SMARTPHONE, · · · |
| ⋮ | ⋮ |

FIG. 24

INFORMATION FOR EACH CASE

| CASE NUMBER | INSPECTION PORTION |
|---|---|
| C001 | WHOLE BODY |
| C002 | UPPER BODY |
| ⋮ | ⋮ |

FIG. 25

INFORMATION FOR EACH CASE

| CASE NUMBER | INSPECTION METHOD |
|---|---|
| C001 | TEMPORARY STOP |
| C002 | PASS THROUGH |
| ⋮ | ⋮ |

FIG. 26

INFORMATION FOR EACH CASE

| CASE NUMBER | REFERENCE VALUE |
|---|---|
| C001 | 80% |
| C002 | 75% |
| ⋮ | ⋮ |

FIG. 27

INFORMATION FOR EACH CASE

| CASE NUMBER | KIND OF INSPECTION |
|---|---|
| C001 | BODY TEMPERATURE INSPECTION, BELONGINGS INSPECTION BY ELECTROMAGNETIC WAVE, · · · |
| ⋮ | ⋮ |

INSPECTION SYSTEM FOR INSPECTING CONTENTS OF A TARGET PERSON, AND INSPECTION METHOD THEREOF

TECHNICAL FIELD

The present invention relates to an inspection system and an inspection method.

BACKGROUND ART

Patent Document 1 (Japanese Patent Application Publication No. 2004-126829) discloses a configuration in which a type of a visitor (an employee, a contractor, a person whose entrance is not allowed, a person who has already visited) is discriminated based on an image generated by photographing a visitor, and entrance processing to be performed for a visitor is determined according to a result of the discrimination.

Patent Document 2 (International Publication No. WO2015/136938) discloses a configuration in which a degree of congestion at a boarding gate is detected, and a processing speed of authentication processing of a person passing the boarding gate is changed according to the detected degree of congestion.

DISCLOSURE OF THE INVENTION

For ensuring safety and the like, an inspection such as a belongings inspection is performed in various places.

In the inspection, shortening a waiting time is expected. An object of the present invention is to shorten a waiting time for an inspection by a method that is not available conventionally.

The present invention provides an inspection system including:
  an acquisition means for acquiring material information including at least either one of a piece of personal unique information unique to each of inspection target persons, and a piece of environment information indicating a state value of an environment that changes at each inspection timing; and
  a determination means for determining a content of an inspection for the each inspection target person and/or at the each inspection timing, based on the material information.
  Further, the present invention provides an inspection method including:
  by a computer,
  acquiring material information including at least either one of a piece of personal unique information unique to each of inspection target persons, and a piece of environment information indicating a state value of an environment that changes at each inspection timing; and
  determining a content of an inspection for the each inspection target person and/or at the each inspection timing, based on the material information.
  According to the present invention, it is possible to shorten a waiting time for an inspection.

BRIEF DESCRIPTION OF THE DRAWINGS

FIG. 5 is a diagram schematically illustrating one example of information to be processed by the inspection system according to the present example embodiment.

FIG. 6 is a diagram schematically illustrating one example of information to be processed by the inspection system according to the present example embodiment.

FIG. 7 is a diagram schematically illustrating one example of information to be processed by the inspection system according to the present example embodiment.

FIG. 8 is a diagram schematically illustrating one example of information to be processed by the inspection system according to the present example embodiment.

FIG. 9 is a diagram schematically illustrating one example of information to be processed by the inspection system according to the present example embodiment.

FIG. 10 is a diagram schematically illustrating one example of information to be processed by the inspection system according to the present example embodiment.

FIG. 13 is a diagram schematically illustrating one example of information to be processed by the inspection system according to the present example embodiment.

FIG. 14 is a diagram schematically illustrating one example of information to be processed by the inspection system according to the present example embodiment.

FIG. 15 is a diagram schematically illustrating one example of information to be processed by the inspection system according to the present example embodiment.

FIG. 16 is a diagram schematically illustrating one example of information to be processed by the inspection system according to the present example embodiment.

FIG. 17 is a diagram schematically illustrating one example of information to be processed by the inspection system according to the present example embodiment.

FIG. 18 is a diagram schematically illustrating one example of information to be processed by the inspection system according to the present example embodiment.

FIG. 19 is a diagram schematically illustrating one example of information to be processed by the inspection system according to the present example embodiment.

FIG. 20 is a diagram schematically illustrating one example of information to be processed by the inspection system according to the present example embodiment.

FIG. 21 is a diagram schematically illustrating one example of information to be processed by the inspection system according to the present example embodiment.

FIG. 22 is a diagram schematically illustrating one example of information to be processed by the inspection system according to the present example embodiment.

FIG. 23 is a diagram schematically illustrating one example of information to be processed by the inspection system according to the present example embodiment.

FIG. 24 is a diagram schematically illustrating one example of information to be processed by the inspection system according to the present example embodiment.

FIG. 25 is a diagram schematically illustrating one example of information to be processed by the inspection system according to the present example embodiment.

FIG. 26 is a diagram schematically illustrating one example of information to be processed by the inspection system according to the present example embodiment.

FIG. 27 is a diagram schematically illustrating one example of information to be processed by the inspection system according to the present example embodiment.

DESCRIPTION OF EMBODIMENTS

In the following, example embodiments according to the present invention are described by using the drawings. Note that, in every drawing, a similar component is designated with a similar reference sign, and description thereof is omitted as necessary.

An inspection system according to the present invention acquires material information including at least either one of a piece of "personal unique information unique to each of inspection target persons", and a piece of "environment information indicating a state value of an environment that changes at each inspection timing", and determines a content of an inspection for each inspection target person and/or at each inspection timing, based on the material information. In the following, example embodiments of an inspection system according to the present invention are described in detail. Note that, an overview of each example embodiment is as follows.

In a first example embodiment, an inspection system determines a content of a belongings inspection for each inspection target person, based on personal unique information indicating a group to which an inspection target person belongs.

In a second example embodiment, an inspection system determines a kind of inspection to be performed for each inspection target person, based on personal unique information indicating a group to which an inspection target person belongs.

In a third example embodiment, an inspection system determines a content of a belongings inspection for each inspection target person, based on personal unique information concerning an inspection target person individual.

In a fourth example embodiment, the inspection system determines a kind of inspection to be performed for each inspection target person, based on personal unique information concerning an inspection target person individual.

In a fifth example embodiment, an inspection system determines a content of a belongings inspection at each inspection timing, based on environment information.

In a sixth example embodiment, an inspection system determines a kind of inspection to be performed at each inspection timing, based on environment information.

In a seventh example embodiment, an inspection system determines a content of a belongings inspection or a kind of inspection to be performed at each inspection timing and for each inspection target person, based on personal unique information and environment information.

First Example Embodiment

"Overview"

Figure 1:
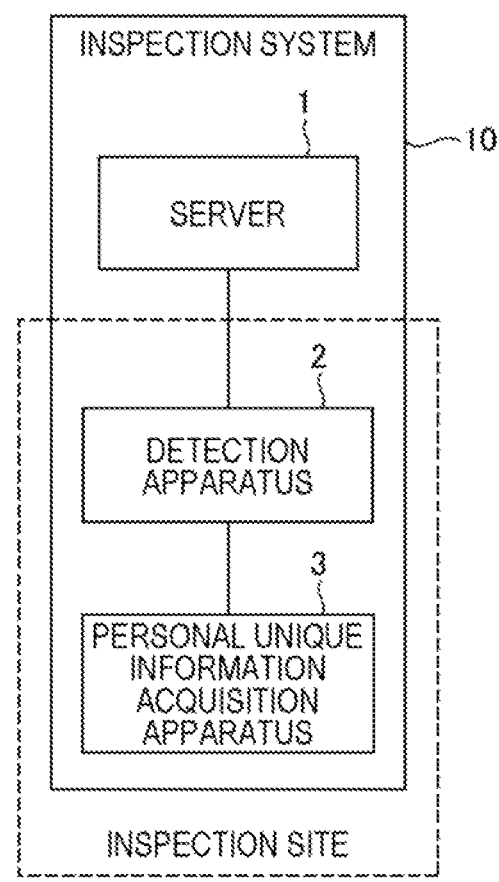
FIG. 1 is a diagram illustrating a configuration example of an inspection system according to the present example embodiment.

As illustrated in FIG. 1, an inspection system 10 according to the present example embodiment includes a server 1, a detection apparatus 2, and a personal unique information acquisition apparatus 3. The detection apparatus 2 and the personal unique information acquisition apparatus 3 are installed in any facility where a belongings inspection is necessary. As the facility, a building, an office, an amusement facility, an airport, a station, and the like are exemplified, but the facility is not limited thereto. Note that, an installation location of the server 1 is not specifically limited.

The detection apparatus 2 performs processing of detecting a detection target object from an inspection target person, based on a signal of a reflection wave of an electromagnetic wave having a wavelength of equal to or more than 30 micrometers and equal to or less than one meter. The personal unique information acquisition apparatus 3 acquires, from an inspection target person before the above-described processing by the detection apparatus 2 is performed, personal unique information indicating a group to which the inspection target person belongs. The server 1 determines a content of a belongings inspection for each inspection target person, based on personal unique information. For example, the server 1 determines whether a belongings inspection is to be performed, a kind of a target object to be detected, and the like for each inspection target person, based on personal unique information. Further, the server 1 performs predetermined processing in such a way that a belongings inspection for each inspection target person has a determined content.

In the inspection system 10 according to the present example embodiment as described above, it is possible to perform a belongings inspection of a content suitable for each piece of personal unique information with respect to each of a plurality of inspection target persons. For example, for a person in which necessity of a belongings inspection is low such as a police officer and a child, a belongings inspection may not be performed, or it is possible to reduce the number of kinds of target objects to be detected. On the other hand, for a person in which necessity of a belongings inspection is high, a belongings inspection may be performed, or it is possible to increase the number of kinds of target objects to be detected. In this way, by adjusting a content of an inspection according to necessity of a belongings inspection, a belongings inspection can be made efficient, and a waiting time for an inspection can be shortened.

"Hardware Configuration"

Figure 2:
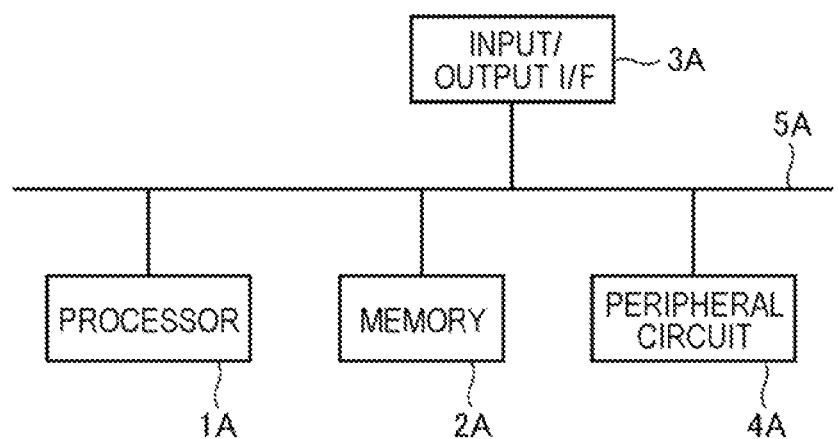
FIG. 2 is a diagram illustrating one example of a hardware configuration of an apparatus according to the present example embodiment.

Next, one example of a hardware configuration of the inspection system 10 is described. FIG. 2 is a diagram illustrating a hardware configuration example of the inspection system 10. Each functional unit included in the inspection system 10 is achieved by any combination of hardware and software, mainly including a central processing unit (CPU) of any computer, a memory, a program loaded in a memory, a storage unit (capable of storing, in addition to a program stored in advance at a shipping stage of an apparatus, a program downloaded from a storage medium such as a compact disc (CD), a server on the Internet, and the like) such as a hard disk storing the program, and an interface for network connection. It is understood by a person skilled in the art that there are various modification examples as a method and an apparatus for achieving the configuration.

As illustrated in FIG. 2, the inspection system 10 includes a processor 1A, a memory 2A, an input/output interface 3A, a peripheral circuit 4A, and a bus 5A. The peripheral circuit 4A includes various modules. The inspection system 10 may not include the peripheral circuit 4A. Note that, the inspection system 10 may be constituted of a plurality of apparatuses that are physically and/or logically separated. In a case where the inspection system 10 is constituted of a plurality of apparatuses that are physically and/or logically separated, each of the plurality of apparatuses can include the above-described hardware configuration.

The bus 5A is a data transmission path along which the processor 1A, the memory 2A, the peripheral circuit 4A, and the input/output interface 3A mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, an electromagnetic wave transmission/reception apparatus, and the like, an interface for outputting information to an output apparatus, an external apparatus, an external server, an electromagnetic wave transmission/reception apparatus, and the like, and the like. The input apparatus is, for example, a keyboard, a mouse, a microphone, and the like. The output apparatus is, for example, a display, a speaker, a printer, a mailer, and the like. The processor 1A can issue a command to each module, and perform an arithmetic operation, based on an arithmetic operation result of each module.

"Functional Configuration"

Figure 3:
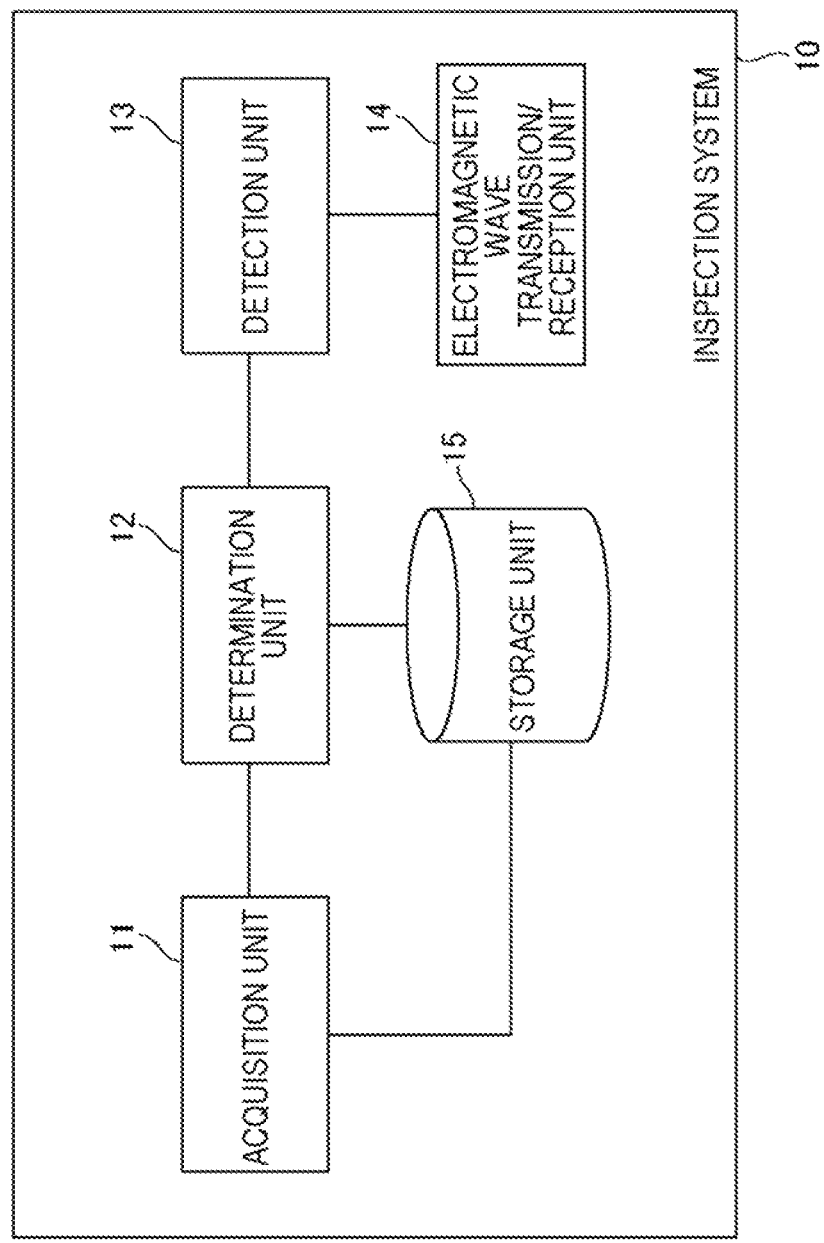
FIG. 3 is a diagram illustrating one example of a functional block diagram of the inspection system according to the present example embodiment.

Next, a functional configuration of the inspection system 10 is described. FIG. 3 illustrates one example of a functional block diagram of the inspection system 10. As illustrated in FIG. 3, the inspection system 10 includes an acquisition unit 11, a determination unit 12, a detection unit 13, an electromagnetic wave transmission/reception unit 14, and a storage unit 15.

These functional units are included in any of the server 1, the detection apparatus 2, and the personal unique information acquisition apparatus 3 in FIG. 1. In which one of these apparatuses, each functional unit is included is not specifically limited, and various patterns can be adopted. For example, the acquisition unit 11 may be achieved by the server 1 and the personal unique information acquisition apparatus 3, the electromagnetic wave transmission/reception unit 14 may be achieved by the detection apparatus 2, the determination unit 12 and the storage unit 15 may be achieved by the server 1, and the detection unit 13 may be achieved by the server 1 or the detection apparatus 2. In the following, a configuration of each functional unit is described.

Figure 4:
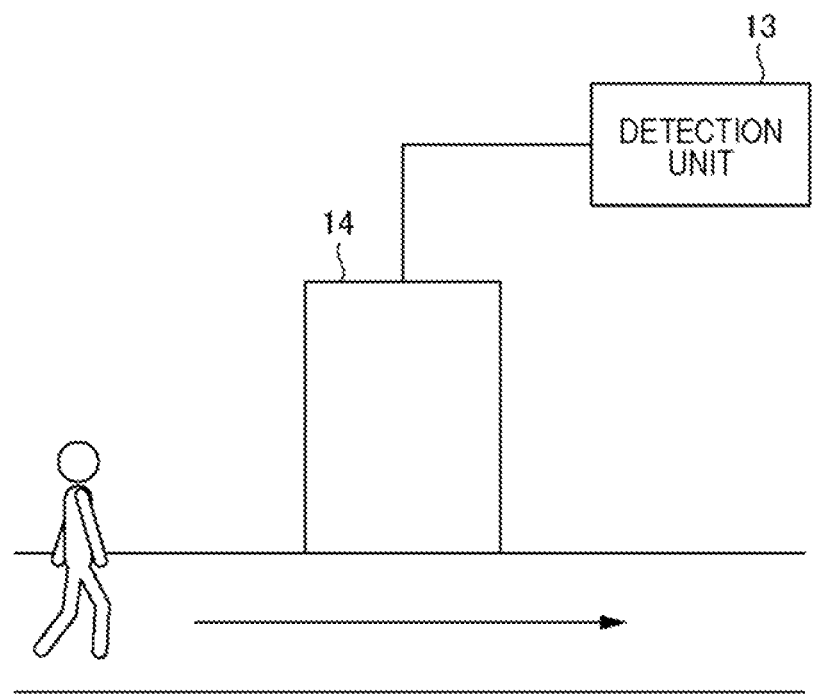
FIG. 4 is a diagram schematically illustrating one example of an electromagnetic wave transmission/reception unit according to the present example embodiment.

The electromagnetic wave transmission/reception unit 14 irradiates an electromagnetic wave (example: a microwave, a millimeter wave, a terahertz wave, and the like) having a wavelength of equal to or more than 30 micrometers and equal to or less than one meter toward an inspection target person present in a predetermined area, and receives a reflection wave. The electromagnetic wave transmission/reception unit 14 is, for example, a radar. The electromagnetic wave transmission/reception unit 14 can be configured by adopting any available technique. For example, as illustrated in an example in FIG. 4, the electromagnetic wave transmission/reception unit 14 may be a sensor panel constituted of a radar in which a plurality of antenna elements are arranged. Note that, the panel is one example, and the electromagnetic wave transmission/reception unit 14 may be constituted of another means such as a gate through which an inspection target person passes, and a booth into which an inspection target person enters.

The detection unit 13 performs detection processing of detecting an anomalous state, based on a signal of a reflection wave received by the electromagnetic wave transmission/reception unit 14. An anomalous state in the present example embodiment is a state in which a person present in a predetermined area carries a detection target object being set in advance. The detection target object is, for example, an object that is prohibited to be carried in, and a gun, a knife, a camera, a plastic bottle, and the like are exemplified, but the detection target object is not limited thereto. In the following, one example of determination processing is described.

First Determination Processing Example

In the example, the detection unit 13 generates a transmission image, based on a signal of a reflection wave received by the electromagnetic wave transmission/reception unit 14. Then, the detection unit 13 detects a detection target object from the transmission image, based on a shape of an object appearing in the transmission image. In a case where a detection target object is detected from the transmission image, it is determined that an inspection target person present in a predetermined area carries the detected detection target object.

By preparation in advance, a feature value of a shape of each of a plurality of objects is generated, and registered in the inspection system 10. The detection unit 13 detects a detection target object from a transmission image, based on a collation result between a feature value of a shape of the detection target object, and a feature value of a shape appearing in the transmission image. These processing by the detection unit 13 may be achieved by using an estimation model generated by machine learning based on training data configured of transmission images and labels of a plurality of objects, or may be achieved by template matching.

Second Determination Processing Example

In the example, the detection unit 13 determines whether an inspection target person present in a predetermined area carries a detection target object, based on a feature value (reflection wave feature value) appearing in a signal of a reflection wave received by the electromagnetic wave transmission/reception unit 14. In a case where a reflection wave feature value unique to a detection target object is detected from a signal of a reflection wave, it is determined that an inspection target person present in a predetermined area carries the detected detection target object.

By preparation in advance, a reflection wave feature value of each of a plurality of objects is generated, and registered in the inspection system 10. The detection unit 13 detects a reflection wave feature value unique to a detection target object from a signal of a reflection wave, based on a collation result between a reflection wave feature value of the detection target object, and a feature value appearing in the signal of the reflection wave. These processing by the detection unit 13 may be achieved by using an estimation model generated by machine learning based on training data configured of signals of reflection waves and labels of a plurality of objects, or may be achieved by template matching.

The detection unit 13 can output a detection result via a predetermined output apparatus (such as a display, a speaker, a warning lamp, and a projection apparatus). The output apparatus may be installed, for example, in an inspection site, and provide predetermined information to a manager managing an inspection target person and an inspection. Further, the detection unit 13 may change an output pattern of an output apparatus according to a content of a detection result (whether a detection target object is detected). There are a variety of output manners, and in the present example embodiment, any available means can be adopted.

The acquisition unit 11 acquires personal unique information unique to each of inspection target persons before an inspection (the above-described inspection to be achieved by the detection unit 13 and the electromagnetic wave transmission/reception unit 14) for an inspection target person is performed. Personal unique information in the present example embodiment is information indicating a group to which each of inspection target persons belongs.

A group is defined by using at least one of an occupation, an affiliation in a predetermined organization, a gender, an age group, and presence or absence of data registration in advance. For example, "a group of persons of 10 years old or younger", "a group of police officers", "a group of security guards", "a group of cleaning staff", "a group of women in a department A", "a group of men in a department A", "a group of directors", "a group of body guards", "a group of persons who are not registered in a database", and the like are exemplified, but the group is not limited thereto.

The acquisition unit 11 acquires at least one of target person identification information for identifying a plurality of inspection target persons from one another, information concerning belongings carried by an inspection target person, information concerning clothes of an inspection target person, and an attribute of an inspection target person estimated from an image, and determines a group to which an inspection target person belongs, based on the acquired information. In the following, one example is described.

First Group Determination Processing Example

In the example, target person identification information is attached in advance to each of a plurality of persons, and association information in which target person identification information and a group to which each inspection target person belongs are associated with each other is stored in the storage unit 15.

Then, the acquisition unit 11 acquires target person identification information from each of inspection target persons. As far as target person identification information can identify a plurality of persons from one another, any available technique can be adopted. For example, target person identification information may be characteristic information attached to each person, such as face information (a face image, a feature value of an external appearance to be extracted from a face image, and the like), fingerprint information, voiceprint information, iris information, and gait information. In addition to the above, target person identification information may be information generated for each person, such as information in which numbers, characters, and the like are arranged.

In a case where target person identification information is face information, iris information, gait information, or the like, the acquisition unit 11 is configured by including an imaging apparatus such as a camera. Further, in a case where target person identification information is fingerprint information, the acquisition unit 11 is configured by including a fingerprint sensor (fingerprint reading apparatus). Further, in a case where target person identification information is a voiceprint, the acquisition unit 11 is configured by including a microphone. Further, in a case where target person identification information is information in which numbers, characters, and the like are arranged, the acquisition unit 11 is configured by including an input apparatus such as a near field communicator, a code reader, a touch panel, a keyboard, a physical button, a microphone, and a camera.

In the example, the acquisition unit 11 determines a group to which each inspection target person belongs, based on target person identification information acquired from each inspection target person, and association information stored in the storage unit 15.

Note that, an inspection target person who does not have target person identification information may be determined to belong to "a group of persons who are not registered in a database".

Second Group Determination Processing Example

In the example, the acquisition unit 11 is configured by including an imaging apparatus such as a camera. The acquisition unit 11 analyzes an image including an inspection target person, and acquires at least either one of a piece of information concerning belongings carried by the inspection target person, and a piece of information concerning clothes of the inspection target person. Then, the acquisition unit 11 estimates an occupation, an affiliation in a predetermined organization, and the like of the inspection target person, based on these pieces of information. Specifically, an occupation, an affiliation in a predetermined organization, and the like of the person are estimated based on a uniform, a batch, belongings, and the like.

A feature value of belongings and clothes unique to each of an occupation, an affiliation in a predetermined organization, and the like is stored in advance in the storage unit 15 for each of an occupation, an affiliation in a predetermined organization, and the like. The acquisition unit 11 analyzes an image acquired by capturing an inspection target person, and estimates an occupation, an affiliation in a predetermined organization, and the like of the inspection target person by detecting these feature values.

Third Group Determination Processing Example

In the example, the acquisition unit 11 is configured by including an imaging apparatus such as a camera. The acquisition unit 11 analyzes an image including an inspection target person, and estimates an attribute of the inspection target person. Then, the acquisition unit 11 determines a group to which the inspection target person belongs based on the estimated attribute. An attribute to be estimated is an age group, a gender, and the like. Since a technique for estimating these attributes by an image analysis is widely known, description thereof is omitted herein.

Fourth Group Determination Processing Example

In the example, a group to which an inspection target person belongs is determined by combining two or more of the first to third group determination processing examples.

The determination unit 12 determines a content of a belongings inspection for each inspection target person, based on personal unique information acquired by the acquisition unit 11. A belongings inspection is an inspection to be achieved by the detection unit 13 and the electromagnetic wave transmission/reception unit 14. In the following, one example is described.

First Content Determination Example

In the example, the determination unit 12 determines whether a belongings inspection is to be performed for each inspection target person, based on personal unique information. For example, a group is defined as illustrated in FIG. 5, and it is defined whether a belongings inspection is to be performed for each group as illustrated in FIG. 6. Information illustrated in FIGS. 5 and 6 is stored in the storage unit 15.

As illustrated in FIG. 6, the determination unit 12 determines whether a belongings inspection is to be performed for each inspection target person, based on information for each group in which a content of a belongings inspection is defined in advance for each group, and personal unique information (information indicating a group to which an inspection target person belongs) acquired by the acquisition unit 11.

In a case of the example, the determination unit 12 can output a determined content, specifically, whether a belongings inspection is to be performed, via a predetermined output apparatus (such as a display, a speaker, a lamp, and a projection apparatus). The output apparatus may be installed, for example, in an inspection site, and provide predetermined information toward a manager managing an inspection target person and an inspection.

By doing so, an inspection target person for whom it is determined not to perform a belongings inspection can pass the inspection site without passing a location (in front of a panel, a gate, a booth, and the like) where an electromagnetic wave is irradiated by the electromagnetic wave transmission/reception unit 14.

Note that, it may be configured in such a way that an inspection target person for whom it is determined not to perform a belongings inspection also passes a location (in front of a panel, a gate, a booth, and the like) where an electromagnetic wave is irradiated by the electromagnetic wave transmission/reception unit 14, but irradiation of an electromagnetic wave, and receiving of a reflection wave is not performed for the inspection target person (control of the electromagnetic wave transmission/reception unit 14). In addition to the above, it may be configured in such a way that an electromagnetic wave is also irradiated onto an inspection target person for whom it is determined not to perform a belongings inspection, and a reflection wave is received, but detection of a detection target object based on a signal of the reflection wave is not performed (control of the detection unit 13). In addition to the above, it may be configured in such a way that detection of a detection target object is also performed with respect to an inspection target person for whom it is determined not to perform a belongings inspection, but warning is not output even when a predetermined detection target object is detected (control of the detection unit 13).

Second Content Determination Example

In the example, the determination unit 12 determines a detection target object to be detected for each inspection target person, based on personal unique information. For example, a group is defined as illustrated in FIG. 5, and a detection target object is defined for each group as illustrated in FIG. 7. Information illustrated in FIGS. 5 and 7 is stored in the storage unit 15.

As illustrated in FIG. 7, the determination unit 12 determines a target object (detection target object) to be detected in a belongings inspection for each inspection target person, based on information for each group in which a content of a belongings inspection is defined in advance for each group, and personal unique information (information indicating a group to which an inspection target person belongs) acquired by the acquisition unit 11.

In a case of the example, the determination unit 12 notifies a determined content to the detection unit 13. The detection unit 13 performs processing of detecting a determined detection target object. Specifically, in a case of the above-described first determination processing example, the detection unit 13 detects a detection target object from a transmission image, based on a collation result between a feature value of a shape of a determined detection target object, and a feature value of a shape appearing in the transmission image. Further, in a case of the above-described second determination processing example, the detection unit 13 detects a reflection wave feature value unique to a detection target object from a signal of a reflection wave, based on a collation result between a reflection wave feature value of a determined detection target object, and a feature value appearing in the signal of the reflection wave. Note that, a feature value (a feature value of a shape or a reflection wave feature value) of a target object that is not determined as a detection target object is eliminated from a collation target.

Third Content Determination Example

In the example, the determination unit 12 determines an inspection portion for each inspection target person, based on personal unique information. For example, as illustrated in FIG. 5, a group is defined, and as illustrated in FIG. 8, an inspection portion is defined for each group. An inspection portion is a portion to be inspected, and is expressed by at least a part of a physical body (such as a whole body, an upper body, a lower body, and a head portion), or a component (such as a pocket) of clothes. Information indicated in FIGS. 5 and 8 is stored in the storage unit 15.

As illustrated in FIG. 8, the determination unit 12 determines an inspection portion in a belongings inspection for each inspection target person, based on information for each group in which a content of a belongings inspection is defined in advance for each group, and personal unique information (information indicating a group to which an inspection target person belongs) acquired by the acquisition unit 11.

In a case of the example, the determination unit 12 notifies a determined content to the detection unit 13. The detection unit 13 performs processing of detecting a detection target object by analyzing an image of a determined portion. Specifically, in a case of the above-described first determination processing example, first, the detection unit 13 extracts an inspection portion from a transmission image, and thereafter, performs processing of detecting a detection target object by analyzing an image portion in which the extracted portion is captured. A feature value of an external appearance of each of a plurality of portions to be determined as an inspection portion is stored in advance in the storage unit 15. The detection unit 13 extracts an inspection portion from a transmission image, based on a collation result between a feature value of an external appearance of an inspection portion being registered in advance, and a feature value of a shape appearing in the transmission image.

Fourth Content Determination Example

In the example, the determination unit 12 determines an inspection method in a belongings inspection for each inspection target person, based on personal unique information. For example, as illustrated in FIG. 5, a group is defined, and as illustrated in FIG. 9, an inspection method is defined for each group. In the illustrated example, for each group, either one of "a first inspection method (temporary stop) in which an inspection target person temporarily stops in an area where an electromagnetic wave is irradiated (in a case of the example in FIG. 4, in front of the electromagnetic wave transmission/reception unit 14 constituted of a panel)", and "a second inspection method (pass through) in which an inspection target person passes through without temporarily stopping in an area where an electromagnetic wave is irradiated" is defined. In the first inspection method, detection accuracy increases, but a throughput decreases. In the second inspection method, detection accuracy decreases, but a throughput increases. Information illustrated in FIGS. 5 and 9 is stored in the storage unit 15.

As illustrated in FIG. 9, the determination unit 12 determines an inspection method in a belongings inspection for each inspection target person, based on information for each group in which a content of a belongings inspection is defined in advance for each group, and personal unique information (information indicating a group to which an inspection target person belongs) acquired by the acquisition unit 11.

In a case of the example, the determination unit 12 can output a determined content (inspection method) via a predetermined output apparatus (such as a display, a speaker, a lamp, and a projection apparatus). The output apparatus may be installed, for example, in an inspection site, and provide predetermined information to a manager managing an inspection target person and an inspection.

Note that, the above-described first and second inspection methods are merely one example, and another inspection method is available. For example, there are an inspection method in which persons pass through an area where an electromagnetic wave is irradiated one by one, and an inspection method in which a plurality of persons pass through an area where an electromagnetic wave is irradiated at the same time, and either one of the inspection methods may be defined for each group.

Fifth Content Determination Example

In the example, the determination unit 12 determines a reference value for processing of detecting a detection target object for each inspection target person, based on personal unique information. For example, as illustrated in FIG. 5, a group is defined, and as illustrated in FIG. 10, a reference value is defined for each group. Information illustrated in FIGS. 5 and 10 is stored in the storage unit 15.

Herein, a reference value is described. The above-described detection unit 13 computes certainty (also referred to as reliability, likeliness, and the like) with which a feature value unique to a predetermined detection target object is included in a signal of a reflection wave by collation between a feature value of a shape of a detection target object, and a feature value of a shape appearing in a transmission image, or collation between a reflection wave feature value of a detection target object, and a feature value appearing in a signal of a reflection wave. The certainty is expressed by a numerical value. There are a variety of expressing methods, and, for example, certainty may be expressed by percentages. Further, in a case where the certainty is equal to or higher than a reference value, the detection unit 13 determines that a feature value unique to the detection target object is included in a signal of a reflection wave.

The above-described reference value to be determined for each detection target person is a reference value to be compared with the computed certainty. As the reference value increases, the number of times of erroneous detection (detecting an object different from a target object as a detection target object) decreases, and the number of times of detection decreases, but the number of times of missing detection increases. As the reference value decreases, the number of times of erroneous detection (detecting an object different from a target object as a detection target object) increases, and the number of times of detection increases, but the number of times of missing detection decreases.

As illustrated in FIG. 10, the determination unit 12 determines a reference value for processing of detecting a detection target object, based on information for each group in which a content of a belongings inspection is defined in advance for each group, and personal unique information (information indicating a group to which an inspection target person belongs) acquired by the acquisition unit 11.

In a case of the example, the determination unit 12 notifies a determined content to the detection unit 13. The detection unit 13 computes certainty (also referred to as reliability, likeliness, and the like) with which a feature value unique to a predetermined detection target object is included in a signal of a reflection wave by collation between a feature value of a shape of a detection target object, and a feature value of a shape appearing in a transmission image, or collation between a reflection wave feature value of a detection target object, and a feature value appearing in a signal of a reflection wave, and thereafter, determines whether the feature value unique to the predetermined detection target object is included in the signal of the reflection wave, based on a comparison result between the computed certainty and the above-described determined reference value.

Note that, information illustrated in FIG. 10 is based on a premise that reference values of all detection target objects are a same value, but a reference value may differ for each detection target object. Specifically, a reference value for each of a plurality of detection target objects may be defined for each group.

Sixth Content Determination Example

In the example, a plurality of examples are combined from among the first content determination example to the fifth content determination example. For example, it is determined whether a belongings inspection is to be performed for each inspection target person, based on the first content determination example. Then, an inspection content is determined for each inspection target person, based on at least one of the second content determination example to the fifth content determination example with respect to an inspection target person for whom it is determined to perform a belongings inspection.

Figure 11:
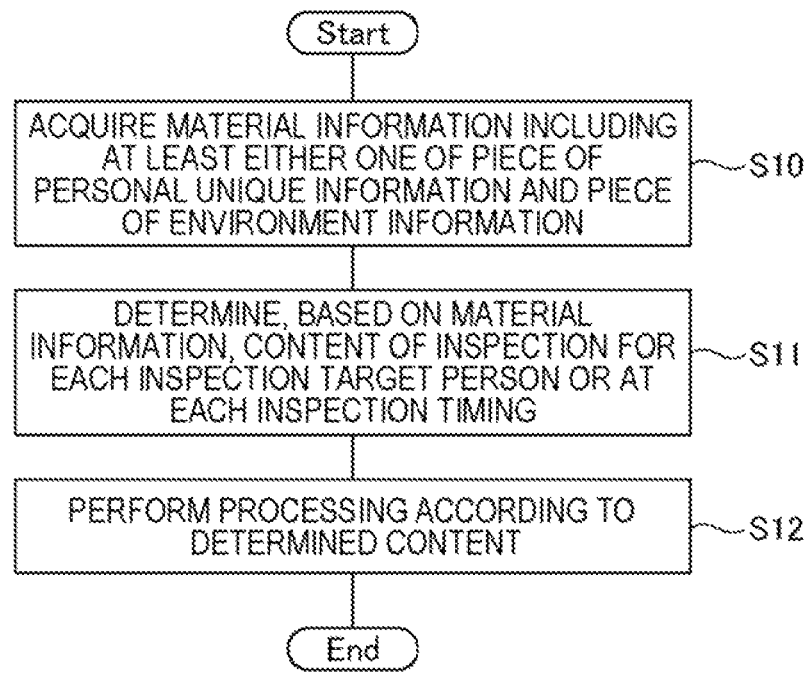
FIG. 11 is a flowchart illustrating one example of a flow of processing of the inspection system according to the present example embodiment.

Next, one example of a flow of processing of the inspection system 10 is described by using a flowchart in FIG. 11.

First, the inspection system 10 acquires material information including at least either one of a piece of personal unique information and a piece of environment information (S10).

In the present example embodiment, the inspection system 10 acquires personal unique information from an inspection target person before a belongings inspection is performed in an inspection site. For example, the inspection system 10 acquires, as personal unique information, information indicating a group to which the inspection target person belongs. The inspection system 10 can acquire at least one of target person identification information for identifying a plurality of inspection target persons from one another, information concerning belongings carried by an inspection target person, information concerning clothes of an inspection target person, and an attribute of an inspection target person estimated from an image, and determine a group to which an inspection target person belongs, based on the acquired information.

Next, the inspection system 10 determines a content of an inspection for each inspection target person and/or at each inspection timing, based on material information acquired in S10 (S11).

In the present example embodiment, the inspection system 10 determines a content of a belongings inspection based on a signal of a reflection wave of an electromagnetic wave having a wavelength of equal to or more than 30 micrometers and equal to or less than one meter for each inspection target person, based on personal unique information (material information). For example, the inspection system 10 can determine whether a belongings inspection is to be performed for each inspection target person, based on personal unique information. Further, the inspection system 10 can determine a content of a belongings inspection for each inspection target person, based on personal unique information.

Next, the inspection system 10 performs predetermined processing in such a way that a belongings inspection for each inspection target person has a determined content (S12). For example, the inspection system 10 presents a determined content toward a manager managing an inspection target person and an inspection, or controls a processing content of the detection unit 13, the electromagnetic wave transmission/reception unit 14, and the like.

"Advantageous Effect"

In the inspection system 10 according to the present example embodiment, it is possible to perform a belongings inspection of a content suitable for each piece of personal unique information with respect to each of a plurality of inspection target persons. For example, for a person in which necessity of a belongings inspection is low such as a police officer and a child, a belongings inspection may not be performed, or it is possible to reduce the number of kinds of target objects to be detected. On the other hand, for a person in which necessity of a belongings inspection is high, a belongings inspection may be performed, or it is possible to increase the number of kinds of target objects to be detected. In this way, by adjusting a content of an inspection according to necessity of a belongings inspection, a belongings inspection can be made efficient, and a waiting time for an inspection can be shortened.

Second Example Embodiment

Figure 12:
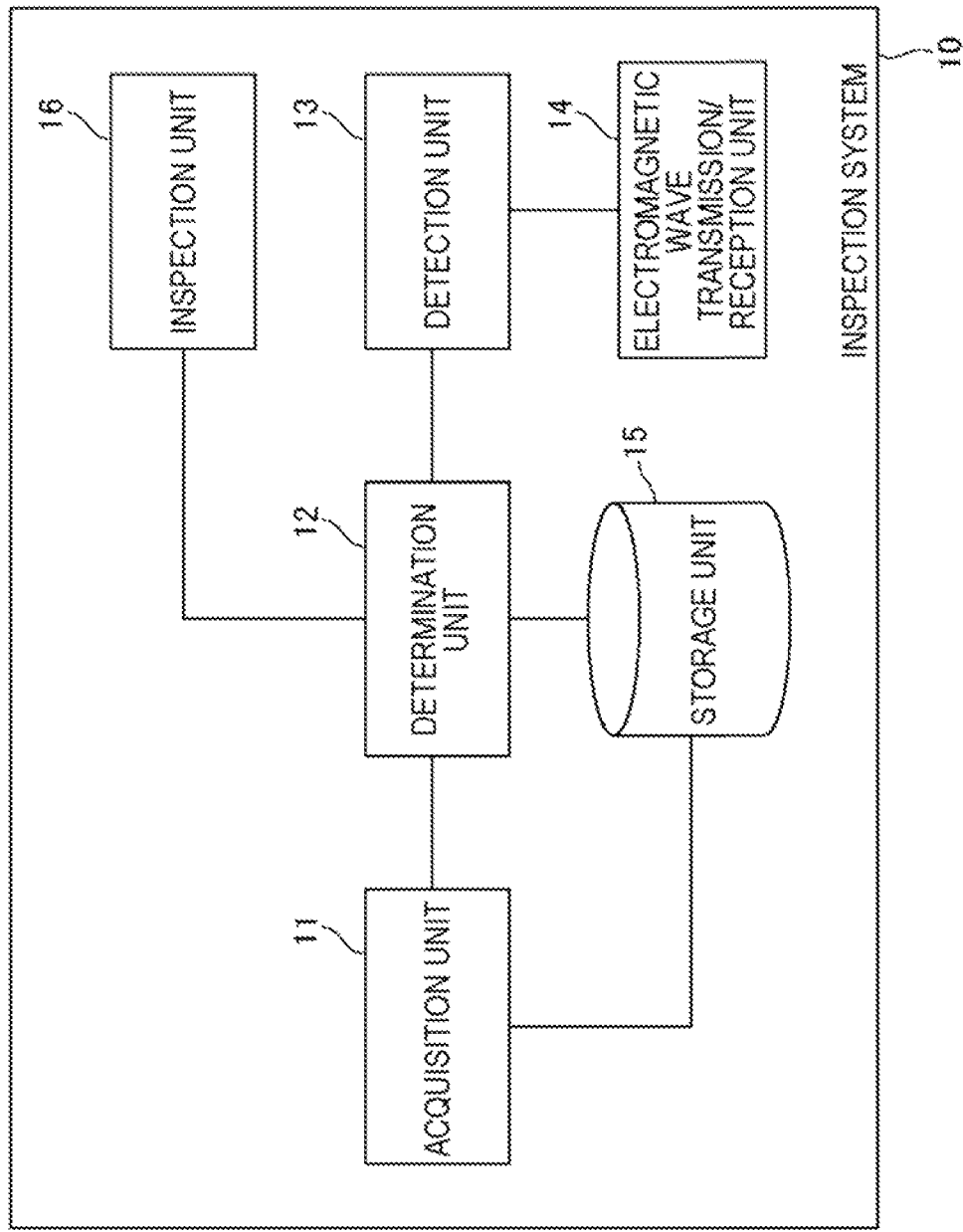
FIG. 12 is a diagram illustrating one example of a functional block diagram of the inspection system according to the present example embodiment.

FIG. 12 illustrates one example of a functional block diagram of an inspection system 10 according to the present example embodiment. The inspection system 10 according to the present example embodiment is different from the inspection system 10 according to the first example embodiment in a point that the inspection system 10 includes an inspection unit 16.

The inspection unit 16 performs, for an inspection target person, an inspection other than a belongings inspection (hereinafter, "a belongings inspection based on a signal of a reflection wave") based on a signal of a reflection wave of an electromagnetic wave having a wavelength of equal to or more than 30 micrometers and equal to or less than one meter, which is described in the first example embodiment. For example, the inspection unit 16 can perform a body temperature inspection in which a body temperature of an inspection target person is measured, a belongings inspection utilizing a metal detector, a belongings inspection utilizing an odor detector, and the like. These inspections can be achieved by adopting any available technique.

The inspection unit 16 can output an inspection result via a predetermined output apparatus (such as a display, a speaker, a warning lamp, and a projection apparatus). The output apparatus may be installed, for example, in an inspection site, and provide predetermined information toward a manager managing an inspection target person and an inspection. Further, the inspection unit 16 may change an output pattern of an output apparatus according to a content of an inspection result. There are a variety of output manners, and in the present example embodiment, any available means can be adopted.

A determination unit 12 determines an inspection to be performed from among a plurality of kinds of inspections for each inspection target person, based on personal unique information indicating a group to which an inspection target person belongs. A plurality of kinds of inspections include, in addition to a belongings inspection based on a signal of a reflection wave to be achieved by a detection unit 13 and an electromagnetic wave transmission/reception unit 14, the above-described various kinds of inspections to be achieved by the inspection unit 16.

For example, as illustrated in FIG. 13, information for each group in which a kind of inspection to be performed for each group is defined may be stored in a storage unit 15. Further, the determination unit 12 may determine an inspection to be performed from among a plurality of kinds of inspections for each inspection target person, based on the information for each group. A concept of a group, and a means for determining a group to which an inspection target person belongs are as described in the first example embodiment.

The determination unit 12 can output a determined content, specifically, information indicating a kind of inspection to be performed, via a predetermined output apparatus (such as a display, a speaker, a lamp, and a projection apparatus). The output apparatus may be installed, for example, in an inspection site, and provide predetermined information to a manager managing an inspection target person and an inspection.

Other configuration of the inspection system 10 according to the present example embodiment is similar to that of the first example embodiment.

As described above, in the inspection system 10 according to the present example embodiment, an advantageous effect similar to that of the first example embodiment is achieved. Further, in the inspection system 10 according to the present example embodiment, an inspection suitable for each inspection target person can be performed. By customizing a content of an inspection depending on a person, it is possible to eliminate waste of inspection. Consequently, an inspection can be made efficient, and a waiting time for an inspection can be shortened.

Third Example Embodiment

The present example embodiment is different from the first example embodiment in a point that a content of a belongings inspection is defined for each inspection target person, instead of defining a content of a belongings inspection for each group. FIG. 3 illustrates one example of a functional block diagram of an inspection system 10 according to the present example embodiment similarly to the first example embodiment.

An acquisition unit 11 acquires, as personal unique information, target person identification information described in the first example embodiment.

A determination unit 12 determines a content of a belongings inspection for each inspection target person, based on personal unique information acquired by the acquisition unit 11. In the following, one example is described.

Seventh Content Determination Example

In the example, the determination unit 12 determines whether a belongings inspection is to be performed for each inspection target person, based on personal unique information. For example, as illustrated in FIG. 14, it is defined whether a belongings inspection is to be performed for each piece of target person identification information. Information illustrated in FIG. 14 is stored in a storage unit 15.

As illustrated in FIG. 14, the determination unit 12 determines whether a belongings inspection is to be performed for each inspection target person, based on information for each person in which a content of a belongings inspection is defined in advance for each inspection target person, and personal unique information (target person identification information) acquired by the acquisition unit 11.

Note that, the determination unit 12 can determine a content of a belongings inspection (whether a belongings inspection is to be performed) for an unregistered person being defined in advance with respect to an inspection target person who does not have target person identification information. Regarding a content of a belongings inspection for an unregistered person, performing a belongings inspection may be defined.

In a case of the example, the determination unit 12 can output a determined content, specifically, whether a belongings inspection is to be performed, via a predetermined output apparatus (such as a display, a speaker, a lamp, and a projection apparatus). The output apparatus may be installed, for example, in an inspection site, and provide predetermined information toward a manager managing an inspection target person and an inspection.

By doing so, an inspection target person for whom it is determined not to perform a belongings inspection can pass the inspection site without passing a location (in front of a panel, a gate, a booth, and the like) where an electromagnetic wave is irradiated by an electromagnetic wave transmission/reception unit 14.

Note that, it may be configured in such a way that an inspection target person for whom it is determined not to perform a belongings inspection also passes a location (in front of a panel, a gate, a booth, and the like) where an electromagnetic wave is irradiated by the electromagnetic wave transmission/reception unit 14, but irradiation of an electromagnetic wave, and receiving of a reflection wave is not performed for the inspection target person (control of the electromagnetic wave transmission/reception unit 14). In addition to the above, it may be configured in such a way that an electromagnetic wave is also irradiated onto an inspection target person for whom it is determined not to perform a belongings inspection, and a reflection wave is received, but detection of a detection target object based on a signal of the reflection wave is not performed (control of a detection unit 13). In addition to the above, it may be configured in such a way that detection of a detection target object is also performed with respect to an inspection target person for whom it is determined not to perform a belongings inspection, but warning is not output even when a predetermined detection target object is detected (control of the detection unit 13).

Eighth Content Determination Example

In the example, the determination unit 12 determines a detection target object to be detected for each inspection target person, based on personal unique information. For example, as illustrated in FIG. 15, a detection target object is defined for each piece of target person identification information. Information illustrated in FIG. 15 is stored in the storage unit 15.

As illustrated in FIG. 15, the determination unit 12 determines a target object (detection target object) to be detected in a belongings inspection for each inspection target person, based on information for each person in which a content of a belongings inspection is defined in advance for each inspection target person, and personal unique information (target person identification information) acquired by the acquisition unit 11.

Note that, the determination unit 12 can determine a content (detection target object) of a belongings inspection for an unregistered person being defined in advance with respect to an inspection target person who does not have target person identification information.

In a case of the example, the determination unit 12 notifies a determined content to the detection unit 13. The detection unit 13 performs processing of detecting a determined detection target object. Specifically, in a case of the first determination processing example described in the first example embodiment, the detection unit 13 detects a detection target object from a transmission image, based on a collation result between a feature value of a shape of a determined detection target object, and a feature value of a shape appearing in the transmission image. Further, in a case of the second determination processing example described in the first example embodiment, the detection unit 13 detects a reflection wave feature value unique to a detection target object from a signal of a reflection wave, based on a collation result between a reflection wave feature value of a determined detection target object, and a feature value appearing in the signal of the reflection wave. Note that, a feature value (a feature value of a shape or a reflection wave feature value) of a target object that is not determined as a detection target object is eliminated from a collation target.

Ninth Content Determination Example

In the example, the determination unit 12 determines a detection target object to be detected for each inspection target person, based on personal unique information, by a method different from a method in the eighth content determination example.

In the example, a plurality of inspection sites are provided in a facility. Further, various kinds of inspections are performed in each of the plurality of inspection sites. For example, an example is proposed in which an inspection site is provided at an entrance of a facility, and an inspection site is provided at an entrance of each of various areas in the facility.

Further, in the example, as illustrated in FIG. 16, an inspection history of an inspection target person is registered in association with target person identification information. Information illustrated in FIG. 16 is stored in the storage unit 15. An inspection history indicates a content of an inspection performed for each inspection target person in an inspection site installed in a facility during a past period. For example, an inspection history indicates a target object being a detection target in a belongings inspection performed for each inspection target person, specifically, a target object for which detection processing has already been performed.

"A past period" may be "on the day", may be "a period earlier than a current time by a predetermined time", or may be a period other than the above. For example, a case is presumed where a person repeatedly comes in and out of a facility, and "a period from a latest timing when a person has entered a facility until a current time" may be set as "a past period".

In the example illustrated in FIG. 16, a serial number, target person identification information, and an inspected target object are registered in association with one another. A serial number is identification information attached to a person who has visited a facility by the inspection system 10. Target person identification information is as described above. An inspected target object indicates a target object being a detection target in a belongings inspection performed for each inspection target person during a past period. Note that, in the illustrated example, identification information (G001 and the like) of an inspection site where an inspection has been performed, and a time (8:13 and the like) when the inspection has been performed are registered in association with each inspected target object, but these pieces of information may not be registered, and other information may be additionally registered.

The determination unit 12 determines a target object (detection target object) to be detected in a belongings inspection in each inspection site for each inspection target person, based on an inspection history of each of inspection target persons as illustrated in FIG. 16. For example, the determination unit 12 determines, as a target object (detection target object) to be detected, a target object other than a detected target object.

In a case of the example, the determination unit 12 notifies a determined content to the detection unit 13. The detection unit 13 performs processing of detecting a determined detection target object. Specifically, in a case of the first determination processing example described in the first example embodiment, the detection unit 13 detects a detection target object from a transmission image, based on a collation result between a feature value of a shape of a determined detection target object, and a feature value of a shape appearing in the transmission image. Further, in a case of the second determination processing example described in the first example embodiment, the detection unit 13 detects a reflection wave feature value unique to a detection target object from a signal of a reflection wave, based on a collation result between a reflection wave feature value of a determined detection target object, and a feature value appearing in the signal of the reflection wave. Note that, a feature value (a feature value of a shape, or a reflection wave feature value) of a target object that is not determined as a detection target object is eliminated from a collation target.

Tenth Content Determination Example

In a case of the example, the determination unit 12 determines an inspection portion for each inspection target person, based on personal unique information. For example, as illustrated in FIG. 17, an inspection portion is defined for each piece of target person identification information. Information illustrated in FIG. 17 is stored in the storage unit 15. An inspection portion is a portion to be inspected, and is expressed by at least a part of a physical body (such as a whole body, an upper body, a lower body, and a head portion), or a component (such as a pocket) of clothes.

As illustrated in FIG. 17, the determination unit 12 determines an inspection portion in a belongings inspection for each inspection target person, based on information for each person in which a content of a belongings inspection is defined in advance for each piece of target person identification information, and personal unique information (target person identification information) acquired by the acquisition unit 11.

In a case of the example, the determination unit 12 notifies a determined content to the detection unit 13. The detection unit 13 performs processing of detecting a detection target object by analyzing an image of a determined portion. Specifically, in a case of the first determination processing example described in the first example embodiment, first, the detection unit 13 extracts an inspection portion from a transmission image, and thereafter, performs processing of detecting a detection target object by analyzing an image portion in which the extracted portion is captured. A feature value of an external appearance of each of a plurality of portions to be determined as an inspection portion is stored in advance in the storage unit 15. The detection unit 13 extracts an inspection portion from a transmission image, based on a collation result between a feature value of an external appearance of an inspection portion being registered in advance, and a feature value of a shape appearing in the transmission image.

Eleventh Content Determination Example

In the example, the determination unit 12 determines an inspection method in a belongings inspection for each inspection target person, based on personal unique information. For example, as illustrated in FIG. 18, an inspection method is defined for each piece of target person identification information. Information illustrated in FIG. 18 is stored in the storage unit 15. In the illustrated example, for each inspection target person, either one of "a first inspection method (temporary stop) in which an inspection target person temporarily stops in an area where an electromagnetic wave is irradiated (in a case of the example in FIG. 4, in front of the electromagnetic wave transmission/reception unit 14 constituted of a panel)", and "a second inspection method (pass through) in which an inspection target person passes through without temporarily stopping in an area where an electromagnetic wave is irradiated" is defined. In the first inspection method, detection accuracy increases, but a throughput decreases. In the second inspection method, detection accuracy decreases, but a throughput increases.

As illustrated in FIG. 18, the determination unit 12 determines an inspection method in a belongings inspection, based on information for each person in which a content of a belongings inspection is defined in advance for each piece of target person identification information, and personal unique information (target person identification information) acquired by the acquisition unit 11.

In a case of the example, the determination unit 12 can output a determined content (inspection method) via a predetermined output apparatus (such as a display, a speaker, a lamp, and a projection apparatus). The output apparatus may be installed, for example, in an inspection site, and provide predetermined information to a manager managing an inspection target person and an inspection.

Note that, the above-described first and second inspection methods are merely one example, and another inspection method is available. For example, there are an inspection method in which persons pass through an area where an electromagnetic wave is irradiated one by one, and an inspection method in which a plurality of persons pass through an area where an electromagnetic wave is irradiated at the same time, and either one of the inspection methods may be defined for each group.

Twelfth Content Determination Example

In the example, the determination unit 12 determines a reference value for processing of detecting a detection target object for each inspection target person, based on personal unique information. For example, as illustrated in FIG. 19, a reference value is defined for each piece of target person identification information. Information illustrated in FIG. 19 is stored in the storage unit 15. A concept of a reference value is as described in the first example embodiment.

As illustrated in FIG. 19, the determination unit 12 determines a reference value for processing of detecting a detection target object, based on information for each person in which a content of a belongings inspection is defined in advance for each piece of target person identification information, and personal unique information (target person identification information) acquired by the acquisition unit 11.

In a case of the example, the determination unit 12 notifies a determined content to the detection unit 13. The detection unit 13 computes certainty (also referred to as reliability, likeliness, and the like) with which a feature value unique to a predetermined detection target object is included in a signal of a reflection wave by collation between a feature value of a shape of a detection target object, and a feature value of a shape appearing in a transmission image, or collation between a reflection wave feature value of a detection target object, and a feature value appearing in a signal of a reflection wave, and thereafter, determines whether the feature value unique to the predetermined detection target object is included in the signal of the reflection wave, based on a comparison result between the computed certainty and the above-described determined reference value.

Note that, information illustrated in FIG. 19 is based on a premise that reference values of all detection target objects are a same value, but a reference value may differ for each detection target object. Specifically, a reference value for each of a plurality of detection target objects may be defined for each piece of target person identification information.

Thirteenth Content Determination Example

In the example, a plurality of examples are combined from among the seventh content determination example to the twelfth content determination example. For example, it is determined whether a belongings inspection is to be performed for each inspection target person, based on the seventh content determination example. Then, an inspection content is determined for each inspection target person, based on at least one of the eighth content determination example to the twelfth content determination example with respect to an inspection target person for whom it is determined to perform a belongings inspection.

Other configuration of the inspection system 10 according to the present example embodiment is similar to that of the first example embodiment.

As described above, in the inspection system 10 according to the present example embodiment, an advantageous effect similar to that of the first example embodiment is achieved. Further, in the inspection system 10 according to the present example embodiment, a content of a belongings inspection suitable for each inspection target person can be defined, and a belongings inspection having the defined content can be performed. By customizing a content of a belongings inspection depending on a person, it is possible to eliminate waste of inspection. Consequently, a belongings inspection can be made efficient, and a waiting time for an inspection can be shortened.

Fourth Example Embodiment

FIG. 12 illustrates one example of a functional block diagram of an inspection system 10 according to the present example embodiment. The inspection system 10 according to the present example embodiment is different from the inspection system 10 according to the third example embodiment in a point that the inspection system 10 includes an inspection unit 16. A configuration of the inspection unit 16 is as described in the second example embodiment.

A determination unit 12 determines an inspection to be performed from among a plurality of kinds of inspections for each inspection target person, based on personal unique information. A plurality of kinds of inspections include, in addition to a belongings inspection based on a signal of a reflection wave to be achieved by a detection unit 13 and an electromagnetic wave transmission/reception unit 14, the various kinds of inspections described in the second example embodiment to be achieved by the inspection unit 16.

For example, as illustrated in FIG. 20, information for each person in which a kind of inspection to be performed for each inspection target person is defined may be stored in a storage unit 15. Further, the determination unit 12 may determine an inspection to be performed from among a plurality of kinds of inspections for each inspection target person, based on the information for each person.

In addition to the above, a plurality of inspection sites may be provided in a facility, and various kinds of inspections may be performed in each of the plurality of inspection sites. For example, an example is proposed in which an inspection site is provided at an entrance of a facility, and an inspection site is provided at an entrance of each of various areas in the facility.

Further, as illustrated in FIG. 21, an inspection history of an inspection target person may be registered in association with target person identification information. Information illustrated in FIG. 21 is stored in the storage unit 15. The illustrated inspection history indicates a kind of inspection performed for each inspection target person in an inspection site installed in a facility during a past period. A concept of a past period is as described in the second example embodiment.

The determination unit 12 determines a kind of inspection to be performed in each inspection site for each inspection target person, based on an inspection history of each of inspection target persons as illustrated in FIG. 21. For example, the determination unit 12 may determine, as an inspection to be performed, an inspection other than a performed inspection.

The determination unit 12 can output a determined content, specifically, information indicating a kind of inspection to be performed, via a predetermined output apparatus (such as a display, a speaker, a lamp, and a projection apparatus). The output apparatus may be installed, for example, in an inspection site, and provide predetermined information toward a manager managing an inspection target person and an inspection.

Other configuration of the inspection system 10 according to the present example embodiment is similar to that of the third example embodiment.

As described above, in the inspection system 10 according to the present example embodiment, an advantageous effect similar to that of the third example embodiment is achieved. Further, in the inspection system 10 according to the present example embodiment, an inspection suitable for each inspection target person can be performed. By customizing a content of an inspection depending on a person, it is possible to eliminate waste of inspection. Consequently, an inspection can be made efficient, and a waiting time for an inspection can be shortened.

Fifth Example Embodiment

An inspection system 10 according to the present example embodiment is different from that according to the first example embodiment in a point that a content of an inspection is determined at each inspection timing, based on environment information indicating a state of an environment that changes at each inspection timing, instead of determining a content of an inspection for each inspection target person, based on personal unique information. FIG. 3 illustrates one example of a functional block diagram of the inspection system 10 according to the present example embodiment similarly to the first example embodiment. Further, the inspection system 10 according to the present example embodiment can be configured to eliminate a personal unique information acquisition apparatus 3 from the configuration illustrated in FIG. 1.

An acquisition unit 11 acquires environment information indicating a state value of an environment that changes at each inspection timing. Environment information can indicate, for example, a state value of a factor that may affect progress of an inspection. Specifically, environment information may indicate at least one of a date and time, a day of a week, a weather, a temperature, a congestion condition of a facility, a content of an event being performed in a facility, a congestion condition of an inspection, the number of staff involved in an inspection, and presence or absence of a factor that causes a traffic jam waiting for an inspection other than an inspection throughput.

A means for acquiring these pieces of environment information is not specifically limited. As the means, for example, referring to data stored in the inspection system 10, acquisition of information stored in a server, an analysis of an image captured in a facility, an input of a state value by a user, and the like are exemplified.

A determination unit 12 determines a content of a belongings inspection at each inspection timing, based on environment information acquired by the acquisition unit 11. A belongings inspection is an inspection to be achieved by a detection unit 13 and an electromagnetic wave transmission/reception unit 14. In the following, one example is described.

Fourteenth Content Determination Example

In the example, the determination unit 12 determines whether a belongings inspection is to be performed at each inspection timing, based on environment information. In the example, a plurality of cases are defined based on a state value of an environment indicated by environment information. As examples of utilizing a congestion condition of a facility, "a first case: a facility is congested", "a second case; a facility is vacant", and the like are conceived. Further, cases may be defined by combining a plurality of pieces of environment information such as "a first case: a facility is congested from Monday to Friday", "a second case: a facility is vacant from Monday to Friday", "a third case: a facility is congested on Saturday and Sunday", and "a fourth case: a facility is vacant on Saturday and Sunday".

Further, as illustrated in FIG. 22, it is defined whether a belongings inspection is to be performed for each case. Information illustrated in FIG. 22 and information (not illustrated) indicating a definition of a plurality of cases are stored in a storage unit 15.

The determination unit 12 determines an associated case, based on environment information acquired by the acquisition unit 11. Thereafter, as illustrated in FIG. 22, the determination unit 12 determines whether a belongings inspection is to be performed at each inspection timing, based on information for each case in which a content of a belongings inspection is defined in advance for each case, and a determination result of a case.

In a case of the example, the determination unit 12 can output a determined content, specifically, whether a belongings inspection is to be performed, via a predetermined output apparatus (such as a display, a speaker, a lamp, and a projection apparatus). The output apparatus may be installed, for example, in an inspection site, and provide predetermined information toward a manager managing an inspection target person and an inspection.

By doing so, an inspection target person can pass the inspection site at a timing when a belongings inspection is determined not to be performed, without passing a location (in front of a panel, a gate, a booth, and the like) where an electromagnetic wave is irradiated by the electromagnetic wave transmission/reception unit 14.

Note that, it may be configured in such a way that, even at a timing when a belongings inspection is determined not to be performed, an inspection target person also passes a location (in front of a panel, a gate, a booth, and the like) where an electromagnetic wave is irradiated by the electromagnetic wave transmission/reception unit 14, but irradiation of an electromagnetic wave, and receiving of a reflection wave is not performed for the inspection target person (control of the electromagnetic wave transmission/reception unit 14). In addition to the above, it may be configured in such a way that, even at a timing when a belongings inspection is determined not to be performed, an electromagnetic wave is irradiated onto an inspection target person, and a reflection wave is received, but detection of a detection target object based on a signal of the reflection wave is not performed (control of the detection unit 13). In addition to the above, it may be configured in such a way that, even at a timing when a belongings inspection is determined not to be performed, processing of detecting a detection target object from an inspection target person is performed, but warning is not output even when a predetermined detection target object is detected (control of the detection unit 13).

Fifteenth Content Determination Example

In the example, the determination unit 12 determines a detection target object to be detected at each inspection timing, based on environment information. First, as described above, a plurality of cases are defined based on a state value of an environment indicated by environment information. Further, as illustrated in FIG. 23, a detection target object is defined for each case. Information illustrated in FIG. 23 and information (not illustrated) indicating definition of a plurality of cases are stored in the storage unit 15.

The determination unit 12 determines an associated case, based on environment information acquired by the acquisition unit 11. Thereafter, as illustrated in FIG. 23, the determination unit 12 determines a detection target object at each inspection timing, based on information for each case in which a content of a belongings inspection is defined in advance for each case, and a determination result of a case.

In a case of the example, the determination unit 12 notifies a determined content to the detection unit 13. The detection unit 13 performs processing of detecting a determined detection target object. Specifically, in a case of the first determination processing example described in the first example embodiment, the detection unit 13 detects a detection target object from a transmission image, based on a collation result between a feature value of a shape of a determined detection target object, and a feature value of a shape appearing in the transmission image. Further, in a case of the second determination processing example described in the first example embodiment, the detection unit 13 detects a reflection wave feature value unique to a detection target object from a signal of a reflection wave, based on a collation result between a reflection wave feature value of a determined detection target object, and a feature value appearing in the signal of the reflection wave. Note that, a feature value (a feature value of a shape or a reflection wave feature value) of a target object that is not determined as a detection target object is eliminated from a collation target.

Sixteenth Content Determination Example

In the example, the determination unit 12 determines an inspection portion at each inspection timing, based on environment information. First, as described above, a plurality of cases are defined based on a state value of an environment indicated by environment information. Further, as illustrated in FIG. 24, an inspection portion is defined for each case. An inspection portion is a portion to be inspected, and is expressed by at least a part of a physical body (such as a whole body, an upper body, a lower body, and a head portion), or a component (such as a pocket) of clothes. Information illustrated in FIG. 24 and information (not illustrated) indicating definition of a plurality of cases are stored in the storage unit 15.

The determination unit 12 determines an associated case, based on environment information acquired by the acquisition unit 11. Thereafter, as illustrated in FIG. 24, the determination unit 12 determines an inspection portion at each inspection timing, based on information for each case in which a content of a belongings inspection is defined in advance for each case, and a determination result of a case.

In a case of the example, the determination unit 12 notifies a determined content to the detection unit 13. The detection unit 13 performs processing of detecting a detection target object by analyzing an image of a determined portion. Specifically, in a case of the first determination processing example described in the first example embodiment, first, the detection unit 13 extracts an inspection portion from a transmission image, and thereafter, performs processing of detecting a detection target object by analyzing an image portion in which the extracted portion is captured. A feature value of an external appearance of each of a plurality of portions to be determined as an inspection portion is stored in advance in the storage unit 15. The detection unit 13 extracts an inspection portion from a transmission image, based on a collation result between a feature value of an external appearance of an inspection portion being registered in advance, and a feature value of a shape appearing in the transmission image.

Seventeenth Content Determination Example

In the example, the determination unit 12 determines an inspection method in a belongings inspection at each inspection timing, based on environment information. First, as described above, a plurality of cases are defined based on a state value of an environment indicated by environment information. Further, as illustrated in FIG. 25, an inspection method is defined for each case. In the illustrated example, for each case, either one of "a first inspection method (temporary stop) in which an inspection target person temporarily stops in an area where an electromagnetic wave is irradiated (in a case of the example in FIG. 4, in front of the electromagnetic wave transmission/reception unit 14 constituted of a panel)", and "a second inspection method (pass through) in which an inspection target person passes through without temporarily stopping in an area where an electromagnetic wave is irradiated" is defined. In the first inspection method, detection accuracy increases, but a throughput decreases. In the second inspection method, detection accuracy decreases, but a throughput increases. For example, it may be defined in such a way that the second inspection method is performed in a case where an inspection is congested, and the first inspection method is performed in a case where a facility is congested. By defining as described above, when an inspection is congested, it is possible to eliminate congestion by increasing a throughput by the second inspection method. Further, in a case where a facility is congested, and a throughput is low regardless of an inspection, it is possible to emphasize detection accuracy than an inspection throughput by the first inspection method. Information illustrated in FIG. 25 and information (not illustrated) indicating definition of a plurality of cases are stored in the storage unit 15.

The determination unit 12 determines an associated case, based on environment information acquired by the acquisition unit 11. Thereafter, as illustrated in FIG. 25, the determination unit 12 determines an inspection method in a belongings inspection at each inspection timing, based on information for each case in which a content of a belongings inspection is defined in advance for each case, and a determination result of a case.

In a case of the example, the determination unit 12 can output a determined content (inspection method) via a predetermined output apparatus (such as a display, a speaker, a lamp, and a projection apparatus). The output apparatus may be installed, for example, in an inspection site, and provide predetermined information to a manager managing an inspection target person and an inspection.

Note that, the above-described first and second inspection methods are merely one example, and another inspection method is available. For example, there are an inspection method in which persons pass through an area where an electromagnetic wave is irradiated one by one, and an inspection method in which a plurality of persons pass through an area where an electromagnetic wave is irradiated at the same time, and either one of the inspection methods may be defined for each group.

Eighteenth Content Determination Example

In the example, the determination unit 12 determines a reference value for processing of detecting a detection target object at each inspection timing, based on environment information. For example, as described above, a plurality of cases are defined based on a state value of an environment indicated by environment information. Further, as illustrated in FIG. 26, a reference value is defined for each case. Information illustrated in FIG. 26 and information (not illustrated) indicating definition of a plurality of cases are stored in the storage unit 15. A concept of a reference value is as described in the first example embodiment.

The determination unit 12 determines an associated case, based on environment information acquired by the acquisition unit 11. Thereafter, as illustrated in FIG. 26, the determination unit 12 determines a reference value for processing of detecting a detection target object, based on information for each case in which a content of a belonging inspection is defined in advance for each case, and a determination result of a case.

In a case of the example, the determination unit 12 notifies a determined content to the detection unit 13. The detection unit 13 computes certainty (also referred to as reliability, likeliness, and the like) with which a feature value unique to a predetermined detection target object is included in a signal of a reflection wave by collation between a feature value of a shape of a detection target object, and a feature value of a shape appearing in a transmission image, or collation between a reflection wave feature value of a detection target object, and a feature value appearing in a signal of a reflection wave, and thereafter, determines whether the feature value unique to the predetermined detection target object is included in the signal of the reflection wave, based on a comparison result between the computed certainty and the above-described determined reference value.

Note that, information illustrated in FIG. 26 is based on a premise that reference values of all detection target objects are a same value, but a reference value may differ for each detection target object. Specifically, a reference value for each of a plurality of detection target objects may be defined for each case.

Nineteenth Content Determination Example

In the example, a plurality of examples are combined from among the fourteenth content determination example to the eighteenth content determination example. For example, it is determined whether a belongings inspection is to be performed at each inspection timing, based on the fourteenth content determination example. Then, an inspection content is determined at each inspection timing, based on at least one of the fifteenth content determination example to the eighteenth content determination example with respect to an inspection target person for whom it is determined to perform a belongings inspection.

Next, one example of a flow of processing of the inspection system 10 is described by using the flowchart in FIG. 11.

First, the inspection system 10 acquires material information including at least either one of a piece of personal unique information and a piece of environment information (S10).

In the present example embodiment, the inspection system 10 acquires environment information at any timing. The following determination on an inspection content, and change of an inspection content are performed in response to acquisition of the environment information. Acquisition of environment information may be performed once a day, or may be performed a plurality of times a day. The inspection system 10 may survey arrival of a predetermined timing (example: every one hour, every 30 minutes) being defined in advance, and perform acquisition of latest environment information when the timing has come. Further, the inspection system 10 may perform acquisition of latest environment information in response to a performance instruction from a user.

Next, the inspection system 10 determines a content of an inspection for each inspection target person and/or at each inspection timing, based on material information acquired in S10 (S11).

In the present example embodiment, the inspection system 10 determines an associated case, based on environment information (material information), and determines a content of a belongings inspection based on a signal of a reflection wave of an electromagnetic wave having a wavelength of equal to or more than 30 micrometers and equal to or less than one meter at each inspection timing, based on a determination result of a case. For example, the inspection system 10 can determine whether a belongings inspection is to be performed at each inspection timing, based on a determination result of a case based on environment information. Further, the inspection system 10 can determine a content of a belongings inspection at each inspection timing, based on a determination result of a case based on environment information.

Next, the inspection system 10 performs predetermined processing in such a way that a belongings inspection for each inspection target person has a determined content (S12). For example, the inspection system 10 provides a determined content toward a manager managing an inspection target person and an inspection, or controls a processing content of the detection unit 13, the electromagnetic wave transmission/reception unit 14, and the like.

Other configuration of the inspection system 10 according to the present example embodiment is similar to that of the first example embodiment.

As described above, in the inspection system 10 according to the present example embodiment, an advantageous effect similar to that of the first example embodiment is achieved. Further, in the inspection system 10 according to the present example embodiment, an inspection by a method suitable for each condition (for each case) can be performed for each condition to be determined by environment information. By customizing a content of an inspection depending on a condition at the time, it is possible to eliminate waste of inspection. Consequently, an inspection can be made efficient, and a waiting time for an inspection can be shortened.

Sixth Example Embodiment

FIG. 12 illustrates one example of a functional block diagram of an inspection system 10 according to the present example embodiment. The inspection system 10 according to the present example embodiment is different from the inspection system 10 according to the fifth example embodiment in a point that the inspection system 10 includes an inspection unit 16. A configuration of the inspection unit 16 is as described in the second example embodiment.

A determination unit 12 determines an inspection to be performed from among a plurality of kinds of inspections at each inspection timing, based on environment information. A plurality of kinds of inspections include, in addition to a belongings inspection based on a signal of a reflection wave to be achieved by a detection unit 13 and an electromagnetic wave transmission/reception unit 14, the various kinds of inspections described in the second example embodiment to be achieved by the inspection unit 16.

For example, as illustrated in FIG. 27, information for each case in which a kind of inspection to be performed for each case is defined may be stored in a storage unit 15. Further, after determining an associated case, based on environment information acquired by the acquisition unit 11, the determination unit 12 may determine an inspection to be performed from among a plurality of kinds of inspections at each inspection timing, based on a determined result and information for each case as illustrated in FIG. 27.

The determination unit 12 can output a determined content, specifically, information indicating a kind of inspection to be performed, via a predetermined output apparatus (such as a display, a speaker, a lamp, and a projection apparatus). The output apparatus may be installed, for example, in an inspection site, and provide predetermined information toward a manager managing an inspection target person and an inspection.

Other configuration of the inspection system 10 according to the present example embodiment is similar to that of the fifth example embodiment.

As described above, in the inspection system 10 according to the present example embodiment, an advantageous effect similar to that of the fifth example embodiment is achieved. Further, in the inspection system 10 according to the present example embodiment, an inspection suitable for each condition (for each case) can be performed for each condition to be determined by environment information. By customizing a content of an inspection depending on a condition at the time, it is possible to eliminate waste of inspection. Consequently, an inspection can be made efficient, and a waiting time for an inspection can be shortened.

Seventh Example Embodiment

An inspection system 10 according to the present example embodiment is different from that according to the first to sixth example embodiments in a point that a content of an inspection is determined at each inspection timing and for each inspection target person, based on personal unique information and environment information.

FIG. 3 or 12 illustrates one example of a functional block diagram of the inspection system 10 according to the present example embodiment.

In the present example embodiment, information in which an inspection content of each of a plurality of groups is defined is stored in a storage unit 15 for each case. Further, a determination unit 12 determines a content of an inspection at each inspection timing and for each inspection target person, based on the information.

As another example, in the present example embodiment, information in which an inspection content of each of a plurality of inspection target persons is defined is stored in the storage unit 15 for each case. Further, the determination unit 12 determines a content of an inspection at each inspection timing and for each inspection target person, based on the information.

An inspection content to be determined is as described in the first to sixth example embodiments, and is a content of a belongings inspection, a kind of inspection to be performed, and the like.

Other configuration of the inspection system 10 according to the present example embodiment is similar to that of the first to sixth example embodiments.

As described above, in the inspection system 10 according to the present example embodiment, an advantageous effect similar to that of the first to sixth example embodiments is achieved. Further, in the inspection system 10 according to the present example embodiment, an inspection suitable for each condition (for each case) and each inspection target person can be performed for each condition to be determined by environment information, and for each inspection target person. By customizing a content of an inspection depending on a condition at the time and an inspection target person, it is possible to eliminate waste of inspection. Consequently, an inspection can be made efficient, and a waiting time for an inspection can be shortened.

Modification Examples

In the following, modification examples applicable to the above-described example embodiments are described. Also in these modification examples, an advantageous effect similar to that of the above-described example embodiments are achieved.

First Modification Example

Figure 29:
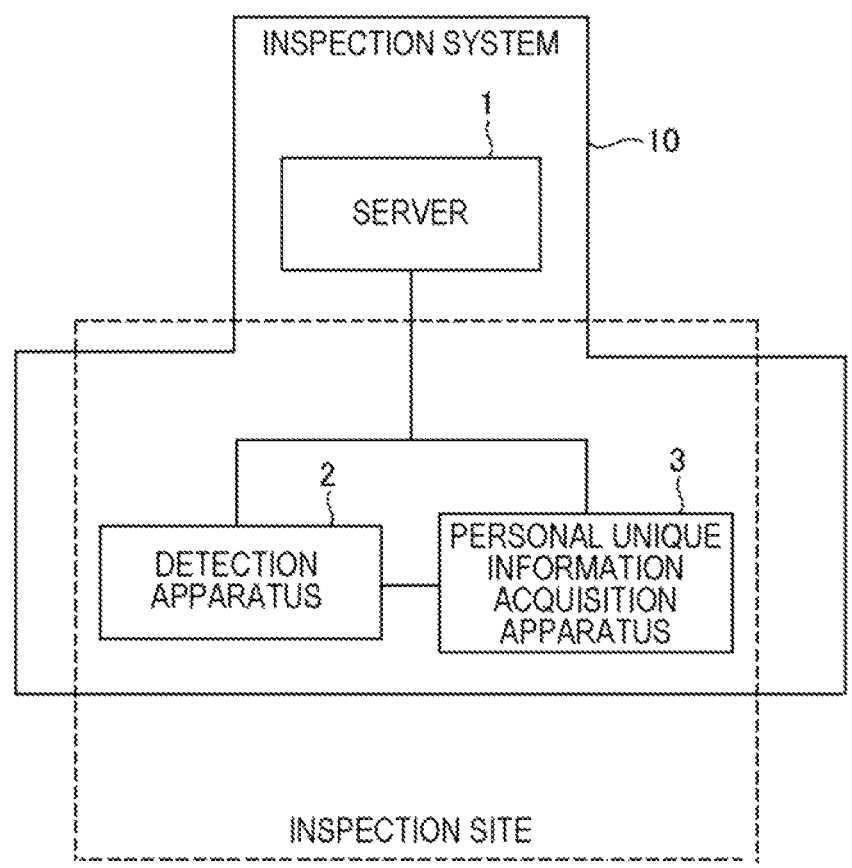
FIG. 29 is a diagram illustrating a configuration example of the inspection system according to the present example embodiment.

In FIG. 1, personal unique information acquired by the personal unique information acquisition apparatus 3 is transmitted to the server 1 via the detection apparatus 2, alternatively, personal unique information acquired by a personal unique information acquisition apparatus 3 may be transmitted to a server 1 without passing through a detection apparatus 2. For example, as illustrated in FIG. 29, the detection apparatus 2 and the personal unique information acquisition apparatus 3 may be connected in parallel to the server 1. Further, for example, an information collecting apparatus for collecting information in an inspection site may be installed in the inspection site. Further, both of the detection apparatus 2 and the personal unique information acquisition apparatus 3 may communicate with the server 1 via the information collecting apparatus.

Second Modification Example

Figure 28:
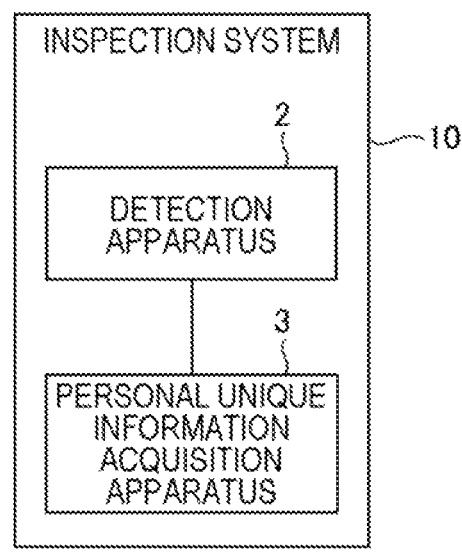
FIG. 28 is a diagram illustrating a configuration example of the inspection system according to the present example embodiment.

As illustrated in FIG. 28, an inspection system 10 may not include the server 1. In this case, an acquisition unit 11, a determination unit 12, a detection unit 13, an electromagnetic wave transmission/reception unit 14, and a storage unit 15 are achieved by the detection apparatus 2 and the personal unique information acquisition apparatus 3 installed in an inspection site. Further, an inspection unit 16 is achieved by a local apparatus installed in the installation site. Note that, in a case where the modification example is applied to the fifth and sixth example embodiments, the inspection system 10 may not include a personal unique information acquisition apparatus 3.

Third Modification Example

In the above-described example embodiments, the personal unique information acquisition apparatus 3 acquires, from an inspection target person before detection processing by the detection apparatus 2 is performed, personal unique information unique to the inspection target person. As a modification example, the personal unique information acquisition apparatus 3 may perform acquisition of personal unique information after electromagnetic wave transmission and reception by the detection apparatus 2 is performed, and before detection processing based on a signal of a reflection wave is performed. For example, a case where determination in an inspection is performed by off-line processing, and the like are proposed.

Fourth Modification Example

An anomalous state in the above-described example embodiments is a state in which a person present in a predetermined area carries a detection target object being set in advance. Further, the detection unit 13 detects, from a signal of a reflection wave, anomalous data (feature value of a detection target object) that are not preferable to be included in a signal of a reflection wave.

In the modification example, the detection unit 13 refers to normal data that are preferable to be included, and performs detection processing of detecting an anomalous state (state different from a state indicated by normal data) from a signal of a reflection wave.

Fifth Modification Example

In the above-described example embodiments, a target object that is prohibited to be carried in is set as a detection target object. Further, a state in which a person present in a predetermined area carries a detection target object being set in advance is detected as an anomalous state. In the modification example, a target object that is needed to be carried by a user is set as a detection target object. For example, a batch of a police officer, an article that is obliged to be carried by a person participating in an event, and the like are a detection target object in the modification example. Further, in the modification example, a state in which a person present in a predetermined area does not carry a detection target object being set in advance is detected as an anomalous state. In this case, it is possible to determine whether a secondary inspection is performed on the spot, or a secondary inspection is performed later, based on an attribute of a user in which an anomalous state is detected. The attribute of a user may be an attribute to be estimated from an image, such as a gender and an age, or may be the one other than the above.

Note that, a target object that is prohibited to be carried in may be set as a detection target object A, and a target object that is needed to be carried by a user may be set as a detection target object B. In this case, a detection result is classified into a plurality of cases "a case where a detection target object A is detected, but a detection target object B is not detected", "a case where a detection target object B is detected, but a detection target object A is not detected", "a case where both of a detection target object A and a detection target object B are detected", "a case where neither a detection target object A nor a detection target object B is detected", and the like. It is a design matter to determine which case is detected as an anomalous state.

Note that, in the present specification, "acquisition" includes at least one of "fetching data stored in another apparatus or a storage medium by an own apparatus (active acquisition)", based on a user input, or based on a command of a program, for example, requesting or inquiring another apparatus and receiving, accessing to another apparatus or a storage medium and reading, and the like, "inputting data to be output from another apparatus to an own apparatus (passive acquisition)", based on a user input, or based on a command of a program, for example, receiving data to be distributed (or transmitted, push-notified, or the like), and acquiring by selecting from among received data or information, and "generating new data by editing data (such as converting into a text, rearranging data, extracting a part of pieces of data, and changing a file format) and the like, and acquiring the new data".

A part or all of the above-described example embodiments may also be described as the following supplementary notes, but is not limited to the following.

1. An inspection system including:
    an acquisition means for acquiring material information including at least either one of a piece of personal unique information unique to each of inspection target persons, and a piece of environment information indicating a state value of an environment that changes at each inspection timing; and
    a determination means for determining a content of an inspection for the each inspection target person and/or at the each inspection timing, based on the material information.
2. The inspection system according to supplementary note 1, wherein
    the determination means determines a content of a belongings inspection based on a signal of a reflection wave of an electromagnetic wave having a wavelength of equal to or more than 30 micrometers and equal to or less than one meter for the each inspection target person or at the each inspection timing.
3. The inspection system according to supplementary note 2, wherein
    the determination means determines whether the belongings inspection is to be performed for the each inspection target person or at the each inspection timing.
4. The inspection system according to supplementary note 2 or 3, wherein
    the determination means determines a detection target object to be detected for the each inspection target person or at the each inspection timing.
5. The inspection system according to any one of supplementary notes 2 to 4, wherein
    the determination means determines a portion of a physical body to be inspected for the each inspection target person or at the each inspection timing.
6. The inspection system according to any one of supplementary notes 2 to 5, wherein
    the determination means determines which one of an inspection method in which an inspection target person temporarily stops in an area where the electromagnetic wave is irradiated, and an inspection method in which an inspection target person passes the area without temporarily stopping is to be performed for the each inspection target person or at the each inspection timing.
7. The inspection system according to any one of supplementary notes 2 to 6, wherein
    the determination means determines an inspection to be performed from among a plurality of kinds of inspections including the belongings inspection for the each inspection target person or at the each inspection timing.

8. The inspection system according to any one of supplementary notes 1 to 7, wherein
   the acquisition means acquires, as the personal unique information, at least either one of a piece of information indicating a group to which the inspection target person belongs, and an inspection history of the inspection target person during a past period.
9. The inspection system according to any one of supplementary notes 1 to 8, wherein
   the acquisition means acquires, as the environment information, information indicating at least one of a date and time, a day of a week, a weather, a temperature, a congestion condition of a facility, a content of an event being performed in a facility, a congestion condition of an inspection, a number of staff involved in an inspection, and presence or absence of a factor that causes a traffic jam waiting for an inspection other than an inspection throughput.
10. An inspection method including:
    by a computer,
    acquiring material information including at least either one of a piece of personal unique information unique to each of inspection target persons, and a piece of environment information indicating a state value of an environment that changes at each inspection timing; and
    determining a content of an inspection for the each inspection target person and/or at the each inspection timing, based on the material information.

1 Server
2 Detection apparatus
3 Personal unique information acquisition apparatus
10 Inspection system
11 Acquisition unit
12 Determination unit
13 Detection unit
14 Electromagnetic wave transmission/reception unit
15 Storage unit
16 Inspection unit
1A Processor
2A Memory
3A Input/output interface (I/F)
4A Peripheral circuit
5A Bus

The invention claimed is:
1. An inspection system comprising:
   at least one memory configured to store one or more instructions; and
   at least one processor configured to execute the one or more instructions to:
   acquire material information including at least one of personal information unique to an inspection target person and environment information at a time of inspection, wherein the personal information comprises at least one of face information, fingerprint information, voiceprint information, iris information, and gait information, and wherein the environment information comprising at least one of a date, a time, a weather, a temperature, a congestion condition of an inspection, and a number of staff involved in the inspection; and
   wherein the at least one processor is further configured to execute the one or more instructions to, based on the acquired material information, perform a belongings inspection based on at least one of:
   a signal of a reflection wave of an electromagnetic wave having a wavelength of equal to or more than 30 micrometers and equal to or less than one meter,
   an object comprising at least one of a personal device or a weapon,
   a portion of a physical body,
   the inspection target person temporarily stopping in an area where the electromagnetic wave is irradiated, and
   the inspection target person passing the area without temporarily stopping.
2. The inspection system according to claim 1, wherein the at least one processor is further configured to execute the one or more instructions to acquire, as the personal information, at least either one of a piece of information indicating a group to which the inspection target person belongs, and an inspection history of the inspection target person during a past period.
3. An inspection method comprising:
   by a computer,
   acquiring material information including at least one of personal information unique to an inspection target person, and environment information at a time of inspection, wherein the personal information comprises at least one of face information, fingerprint information, voiceprint information, iris information, and gait information, and wherein the environment information comprising at least one of a date, a time, a weather, a temperature, a congestion condition of an inspection, and a number of staff involved in the inspection;
   based on the acquired material information, performing a belongings inspection based on at least one of:
   a signal of a reflection wave of an electromagnetic wave having a wavelength of equal to or more than 30 micrometers and equal to or less than one meter,
   an object comprising at least one of a personal device or a weapon,
   a portion of a physical body,
   the inspection target person temporarily stopping in an area where the electromagnetic wave is irradiated, and
   the inspection target person passing the area without temporarily stopping is to be performed in the belongings inspection.

* * * * *